J. P. RADLEY.
POTATO DIGGER.
No. 113,449.                    Patented Apr. 4, 1871.
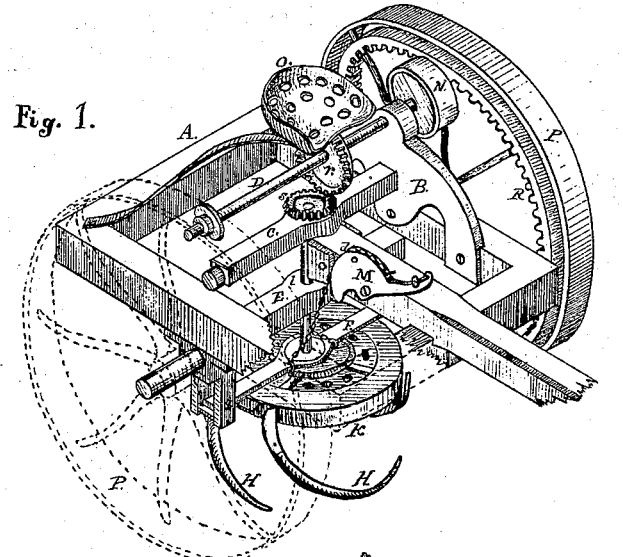
Fig. 1.
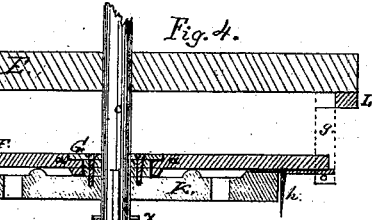
Fig. 3.
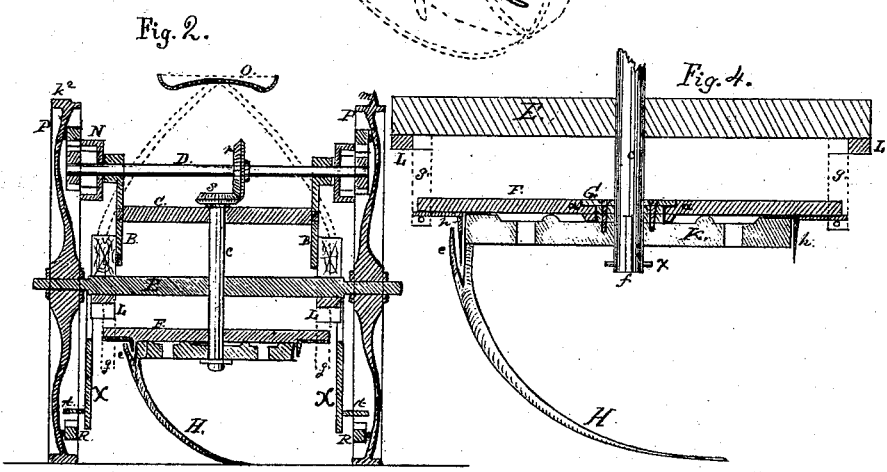
Fig. 2.
Fig. 4.
Witnesses:
Garret Oliver Jr.
Thomas Houghton
Inventor,
John P. Radley

United States Patent Office.

JOHN P. RADLEY, OF ALBANY, NEW YORK.

Letters Patent No. 113,449, dated April 4, 1871.

---

IMPROVEMENT IN POTATO-DIGGERS.

---

The Schedule referred to in these Letters Patent and making part of the same.

---

To all whom it may concern:

Be it known that I, JOHN P. RADLEY, of Albany, in the county of Albany and State of New York, have invented certain Improvements in Potato-Diggers, of which the following is a specification.

The principal part of my invention relates to the construction of an upright or perpendicular digger, which not only digs out the potatoes but also cuts off the vines at the same time by means of a peculiarly-constructed tine, in combination with cutters affixed to a cutter and guide-bar, as will be hereinafter more fully explained.

Another part of my invention relates to the arrangement and combination of an internal gear on the driving-wheels, and a pinion and ratchet-wheel combined, so as to prevent the twisting of the upper shaft when turning the machine around.

Another part of my invention relates to the mode of raising the revolving digger and its cutter-bar together.

In the accompanying drawing—

Figure 1 is a perspective view of a machine embodying my invention.

Figure 2 is a vertical central cross-section of the same.

Figure 3 is a view (enlarged) of each face of the combined pinion and ratchet-wheel.

Figure 4 is an enlarged view of the revolving digger and cutter-bar.

A is the frame of the machine, which frame is rectangular, and should be made of the usual size and strength.

B are metal standards, one of which is secured to each of the inner sides of frame A, as shown in figs. 1 and 2.

C is a central bar secured at each end to standards B.

D is a shaft running through standards B near the top of the same.

E is the axle of the machine, which is made quadrangular in shape, having an enlargement at its center for strength, as shown at $l$, in fig. 1.

F is a cutter and supporting-bar.

Said bar F is enlarged at its center, as shown in fig. 1, and has a recess, $a$, around its central hole, in which a collar, G, which is secured to upright shaft $c$, can revolve.

G is a collar secured to upright shaft $c$, so as to include the cutter-bar F between said collar G and the upper part of wheel K, so that when wheel K is raised by means of lever M and chain $d$, then the bar F will also be raised with it.

H is a tine or digger, constructed larger at its upper than at its lower end.

Said tine H is branched or divided at its upper end, as shown at $e$, in figs. 2 and 4.

The upper ends of tines H are divided or branched, forming a fork or holder by which the potato-vines or grass will be held at right angles to the knives or cutters $h$. Were it not for said forks or holders the vines or grass would twist around the tines and clog between the knife and tine. One or both of the branches or forks of tines H may be made with cutting edges, to assist in severing the vines or grass when they arrive at the cutting point.

K is a horizontally-revolving wheel, at the circumference of which is attached three or any desirable number of spirally-shaped tines, H, constructed as above described.

In the center of wheel K is a key-way or slot, cut in the usual manner radially from its center, and said radial slot is fitted to slide over a rib or feather, $f$, said rib $f$ being secured to the lower end of upright shaft $c$, as shown in fig. 4.

Tines H may be adjusted to dig to any required depth by placing supporting-pin X in any one of a series of horizontal holes in the lower end of shaft $c$, as seen in fig. 4.

It will be seen that by raising wheel K above rib $f$ said wheel K cannot then revolve at all; also that when wheel K is allowed to engage with feather or rib $f$, then both the shaft $c$ and wheel K will revolve together.

L is a metal hanger, by which the axle E is supported to the lower and central part of frame A. Hanger L has two downward-projecting sides, between which the outer ends of cutter-bar F are guided and supported, as shown in figs. 1, 2, and 4.

Near each outer end of cutter-bar F is secured an adjustable knife or cutter, $h$. Said cutters or knives $h$ may be adjusted and held in position by means of set-screws, or other well known and common devices.

Cutters $h$, when in proper position, will be set almost close to the circumference of wheel K, so as to include said cutters $h$ between the upper divided ends of tines H, as seen in figs. 2 and 4. Cutters $h$ may be constructed with straight, curved, or serrated edges.

M is a lever attached to one side of pole S. By means of said lever M and chain K the cutter-bar F and the revolving digger may be raised together, at pleasure.

A seat, O, is provided, in which the driver may sit when operating my machine.

Driving-wheels P may have cog-like projections, $k^2$, or pointed ones, $m$, as shown in fig. 2.

Within each driving-wheel are secured internal gears R, which drive pinions N N, said pinions N N being secured to the ends of shaft D.

By means of bevel-wheel $r$ on shaft D and bevelpinion s at the upper end of shaft c motion is communicated to revolving digger or tines H whenever wheel K is lowered on shaft c, as above described.

It will be seen from the above that, by means of lever M, wheel K and cutter-bar F can be raised or lowered together, thus keeping knives or cutters h and the upper divided or forked ends of tines H always in their proper relative position.

It will also be seen that by the forward motion of driving-wheels P a rotary motion will be communicated to tines H, and that the lower points of tines H will be successively plunged into the hill of potatoes, thus unearthing them, while, at the same time, the potato-vines or grass or weeds will be carried up by the spirally-shaped tines H against the knives or cutters h, and there severed.

To prevent the potatoes or vines from being thrown against the driving-wheels P or upon internal gears R, I provide a semicircular metal shield, X, secured to the under sides of frame A, and having a flange, t, projecting over the lower half of internal gears R, as shown in section in fig. 2.

What I claim as new, and desire to secure by Letters Patent, is—

1. Tines H, constructed with a divided or branched knife at their upper ends, substantially as above described.

2. The revolving wheel K, constructed with tines H cutting at their upper ends, and divided or branched, or neither, in combination with cutter-bar F and cutters h, substantially as and for the purpose herein described.

3. The arrangement and combination of axle E, hanger L, and guides g, with cutter-bar F, as herein shown and described.

4. The arrangement and combination of internal gears R, combined pinion and ratchet-wheel N, bevel-wheel and pinion r and s, shafts D and c, with cutter bar F and wheel K, as herein shown and specified.

JOHN P. RADLEY.

Witnesses:
GARRET OLIVER, Jr.,
THOMAS HOUGHTON.